United States Patent [19]

Shivashankara et al.

[11] Patent Number: 4,625,828
[45] Date of Patent: Dec. 2, 1986

[54] ACOUSTIC REFLECTOR FOR GROUND PLANE MICROPHONE

[75] Inventors: Belur N. Shivashankara, Bellevue; Wendell R. Miller, Renton; Gene W. Stubbs, Seattle, all of Wash.

[73] Assignee: The Boeing Company, Seattle, Wash.

[21] Appl. No.: 773,641

[22] Filed: Sep. 9, 1985

[51] Int. Cl.$^4$ ............................................. H05K 5/00
[52] U.S. Cl. .................................. 181/175; 181/158; 181/242
[58] Field of Search ................ 181/157, 158, 175, 242

[56] References Cited

U.S. PATENT DOCUMENTS

| | | |
|---|---|---|
| 759,428 | 5/1904 | Fannon . |
| 829,849 | 8/1906 | Cutmore . |
| 1,021,434 | 3/1912 | Stockton . |
| 2,020,970 | 11/1935 | Scher . |
| 2,536,261 | 1/1951 | Caldwell, Jr. . |
| 2,627,932 | 2/1953 | Volkmann et al. . |
| 2,697,141 | 12/1954 | Smith . |
| 3,148,293 | 9/1964 | Jones et al. . |
| 3,154,171 | 10/1964 | Knutson et al. . |
| 3,201,516 | 8/1965 | Weingartner . |
| 3,500,301 | 10/1967 | Meier . |
| 3,836,948 | 9/1974 | Burckhardt et al. . |
| 3,918,024 | 11/1975 | Macovski . |
| 3,963,093 | 6/1976 | Morris . |
| 4,069,467 | 1/1978 | Burckhardt et al. . |
| 4,101,865 | 7/1978 | Schurr . |
| 4,522,283 | 6/1985 | Smith .................................. 181/175 |

Primary Examiner—Benjamin R. Fuller
Attorney, Agent, or Firm—Christensen, O'Connor, Johnson & Kindness

[57] ABSTRACT

A flush-dish microphone system for measuring aircraft flyover noise is disclosed. The system includes an acoustically hard base supporting a microphone. The base is configured along its periphery to define a plurality of outwardly extending tapered members. Each of the tapered members includes a pair of converging edges that are each at least in part curved. The curved edges produce a favorable progressive match of acoustic impedance at the ground/tapered member boundary that reduces edge diffraction contamination of the noise signal being measured by the microphone.

19 Claims, 9 Drawing Figures

ACOUSTIC REFLECTOR FOR GROUND PLANE MICROPHONE

TECHNICAL FIELD

The present invention relates in general to microphone systems for measuring the flyover noise produced by an aircraft, and in particular to such systems wherein a microphone is supported immediately adjacent the ground, so-called ground plane microphones.

BACKGROUND OF THE INVENTION

Aircraft flyover noise is a well-recognized environmental problem that has received much public attention. Present local and federal regulations substantially limit the magnitude of such noise, and even more stringent regulations are under active consideration. In a continuing effort to develop new techniques for achieving aircraft noise suppression to meet and/or exceed present and proposed noise regulations, the aircraft industry has dedicated a substantial amount of effort towards acquiring a thorough understanding of the noise source mechanisms within aircraft. This necessarily requires that highly accurate and reliable aircraft noise measurements be available, particularly for aircraft while in flight.

The measurement of aircraft flyover noise is typically performed by flying an aircraft at a relatively low altitude over a ground-based microphone installation. A problem associated with such installations resides in the fact that any vertical spacing between the ground and the microphone gives rise to a condition wherein the microphone is subjected to noise signals both directly from the aircraft and from a ground reflected component of the direct signal. As a consequence, there occur reinforcements and cancellations of the total signal measured at the microphone that are a function of both noise signal frequency and the relative position of the microphone with respect to the aircraft. Ground reflection interference in flyover noise spectra is undesirable when the objective of the noise analysis is a detailed breakdown of the various components of noise produced solely by the aircraft.

The interference phenomenon resulting from the interaction of direct and reflected noise signals can be mitigated to a substantial degree by the use of a ground plane microphone. Very briefly, a ground plane microphone consists of an otherwise conventional microphone that is positioned immediately adjacent an acoustically hard surface. A characterizing feature of such a surface is that it reflects substantially all of the energy associated with incident noise signals. In other words, little, if any, of the energy is absorbed by the surface. In the ideal situation, the microphone is surrounded by an acoustically hard surface having infinite horizontal dimensions, and the microphone's diaphragm is supported such that it lies in upwardly facing, coplanar alignment with the surface. Such a microphone installation will measure aircraft flyover noise as a sound pressure that is twice the magnitude of what would otherwise be measured in the free field. This holds true at all frequencies and incidence angles of interest.

An excellent example of an acoustically hard surface is an aircraft runway. A ground plane microphone that closely simulates ideal conditions is achieved by mounting a microphone in the runway such that the microphone's diaphragm is flush with the runway surface and surrounded on all sides by a relatively broad horizontal expanse of runway surface. While near ideal results can be achieved with such an installation, it is impractical in most applications because it requires boring a hole into the runway to accommodate the microphone. Even if providing holes in the runway were not a problem, such a microphone installation has the disadvantage of preventing, or at least making difficult, the repositioning of the microphone.

Variants of the idealized arrangement include simply lying a microphone on an acoustically hard surface such that the plane of its diaphragm is perpendicular to the surface and parallel to the aircraft flight path. This is a so-called grazing incidence microphone. Because the microphone diaphragm is very close to the ground, and because the direct and reflected noise signals are almost in phase at low and mid-frequencies, a pressure doubling effect similar to the idealized arrangement is obtained at these frequencies. The main disadvantage of this arrangement is that the finite vertical dimension of the microphone diaphragm is still such that undesirable interference between direct and reflected noise signals occurs at the microphone, particularly at the higher frequency end of the aircraft flyover noise spectrum.

Another variant employs a microphone that is suspended in facing alignment with an acoustically hard surface, but spaced vertically therefrom. This arrangement is known as an inverted microphone, and its response is very similar to that of a grazing incidence microphone. It likewise suffers from undesirable interference between direct and reflected noise signals at the microphone.

While grazing incidence microphones and inverted microphones have proven useful for measuring aircraft flyover noise to a more accurate degree than microphones suspended above ground, they are nevertheless still subject to the aforementioned interference effects that detract from their ability to accurately measure noise over the entire frequency spectrum of interest.

A ground plane microphone that substantially avoids the problems associated with interfering noise signals, while enjoying much greater versatility than the near idealized arrangement previously discussed, comprises a microphone having its diaphragm flush-mounted with the upper surface of a relatively lightweight, acoustically hard plate that is dimensioned to reflect all noise signals falling within the frequency spectrum of interest. This arrangement is known as a flush-dish microphone, and generally takes the form of a circular disc having the microphone diaphragm located at the disc center. A flush-dish microphone closely approximates an ideal ground plane microphone in that it is substantially free of the undesirable interference effects previously noted for most noise signal angles of incidence. One drawback associated with flush-dish microphones resides in the fact that the noise signal at the microphone diaphragm is contaminated by signals diffracted by the periphery of the disc whenever the aircraft is located substantially directly overhead the microphone. Thus, wile flush-dish microphones have proven useful for obtaining highly accurate noise signal measurements, they too suffer from interference effects, albeit to a lesser degree than other ground plane microphones.

SUMMARY OF THE INVENTION

The edge diffraction effects associated with flush-dish microphones are believed to result from the sudden chane of acoustic impedance occurring at the boundary between the disc's periphery and the terrain on which the disc is situated. According to the present invention, such edge diffraction effects are overcome to a substantial degree by configuring the periphery of the disc to provide a gradual impedance match at the disc/terrain boundary. More particularly, the periphery of the disc is configured to define, in plan form, a plurality of tapered members extending radially outward from a central core. The converging edges of each tapered member are at least in part curved to provide a variable edge slope between each member's tip and root. The unique shape of the members results in the gradual matching of acoustic impedance regardless of whether the sound waves are radially approaching or leaving the center of the disc. As a consequence, the aforementioned contamination of the signal measured by the microphone when an aircraft is substantially directly overhead is significantly reduced.

One key advantage of the present invention over the prior art resides in its ability to measure aircraft flyover noise while situated upon numerous different types of terrain. Preferably, such noise measurements are conducted with the invention positioned upon an acoustically hard surface such as an aircraft runway or the like. If such a hard surface is not available, the invention will work with equal facility while situated on natural terrain that is otherwise relatively acoustically soft.

In accordance with one aspect of the present invention, a flush-dish microphone is provided wherein the disc and tapered members are unitary and provide a base for supporting a flush-mounted microphone.

In accordance with alternative aspects of the present invention, the disc of a flush-dish microphone is provided with a plurality of flexible plates that are detachably mounted about the periphery of the disc. The plates are radially positioned and extend beyond the disc periphery to define, in plan form, a plurality of tapered members. Whereas the form of the present invention embodying the disc and tapered members as a unitary base requires that the terrain on which it is situated be relatively flat, the plates of the alternative form of the invention, to a limited degree, accommodate uneven terrain. Consequently, the time and labor necessary to set up the microphone for operation is reduced.

BRIEF DESCRIPTION OF THE DRAWINGS

So that the present invention is more clearly understood, reference is now made to the several accompanying drawings wherein like reference numerals refer to like parts throughout the several views, and wherein:

FIG. 3 is a top plan view and a plurality of cross-sectional side views of the shaded wedge-shaped segment in FIG. 2 identified by the reference numeral 21a;

DETAILED DESCRIPTION OF THE PREFERRED EMBODIMENTS

Figure 1:
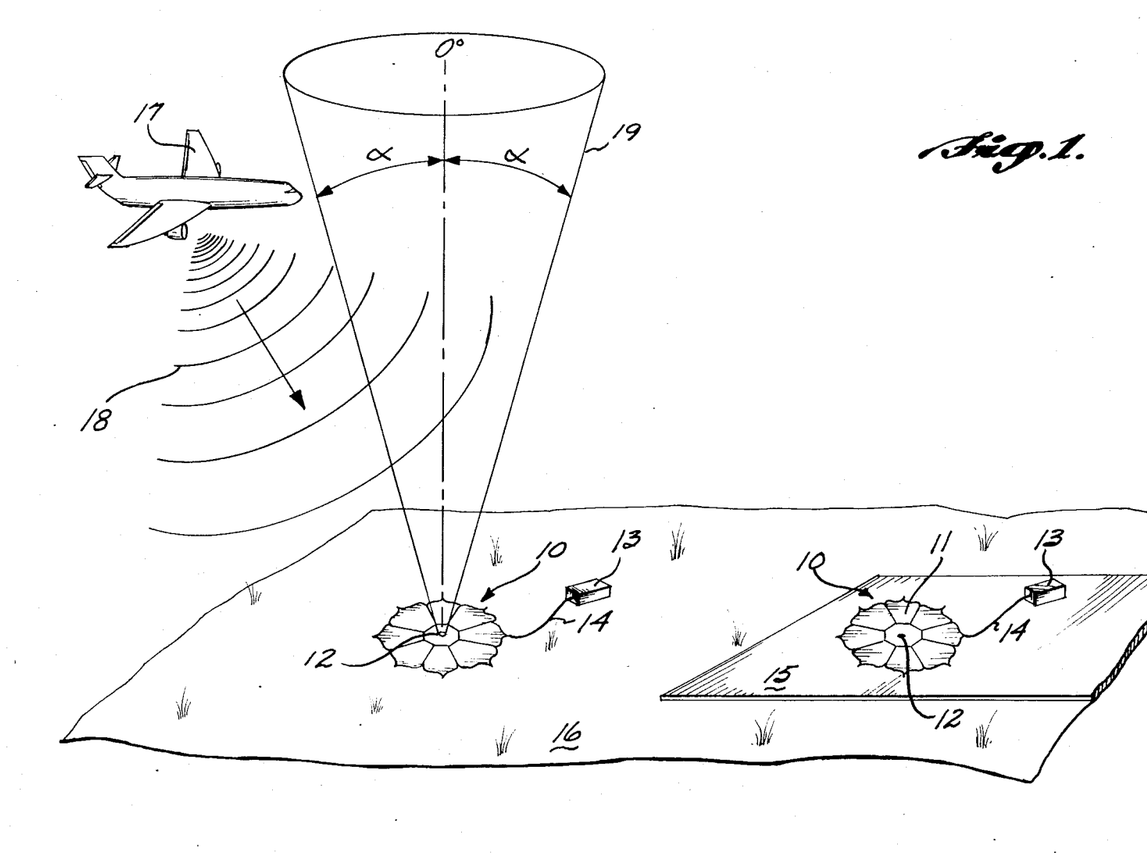
FIG. 1 is a general overview illustrating the manner in which the present invention will typically be employed.

A more complete understanding of how the present invention is employed to measure aircraft flyover noise will be realized by now referring to FIG. 1. Briefly, the figure illustrates a pair of flush-dish microphone systems 10. Each flush-dish microphone system 10 comprises an acoustically hard reflector or base 11 providing support for a microphone 12 mounted flush therewith, a noise data recorder 13, and an electrical lead 14 connecting the microphone 12 with the noise data recorder 13. One of the flush-dish microphone systems 10 is illustrated resting upon an acoustically hard surface 15 such as, for example, an aircraft runway, whereas the other of the flush-dish microphone systems 10 is shown resting upon natural terrain comprising an otherwise relatively acoustically soft surface 16.

The flush-dish microphone systems 10 may be advantageously employed upon either type of the foregoing surfaces to measure aircraft flyover noise. This is accomplished by guiding an aircraft 17 along a predetermined path passing over the systems 10 such that the noise signals 18 emanating from the aircraft 17 fall incident upon, and are sensed by, the microphone 12. Such noise signals are then transmitted to the noise data recorder 13 via the electrical lead 14. While a pair of flush-dish microphone systems 10 are shown, this is for purposes of illustration only. In actual practice, only one such system is required in order to obtain flyover noise data.

In order to provide the reader with a visual reference of overhead positions wherein flush-dish microphone systems of the prior art are particularly susceptible to the edge diffraction effects that contaminate the signal measured at the microphone, a cone 19 is shown extending upwardly from one of the microphones 12. In most typical situations the cone angle $\alpha$ is approximately 15° to either side of vertical. A characterizing feature of the present invention is that the prior limiting condition represented by the cone 19 is substantially alleviated.

Figure 2:
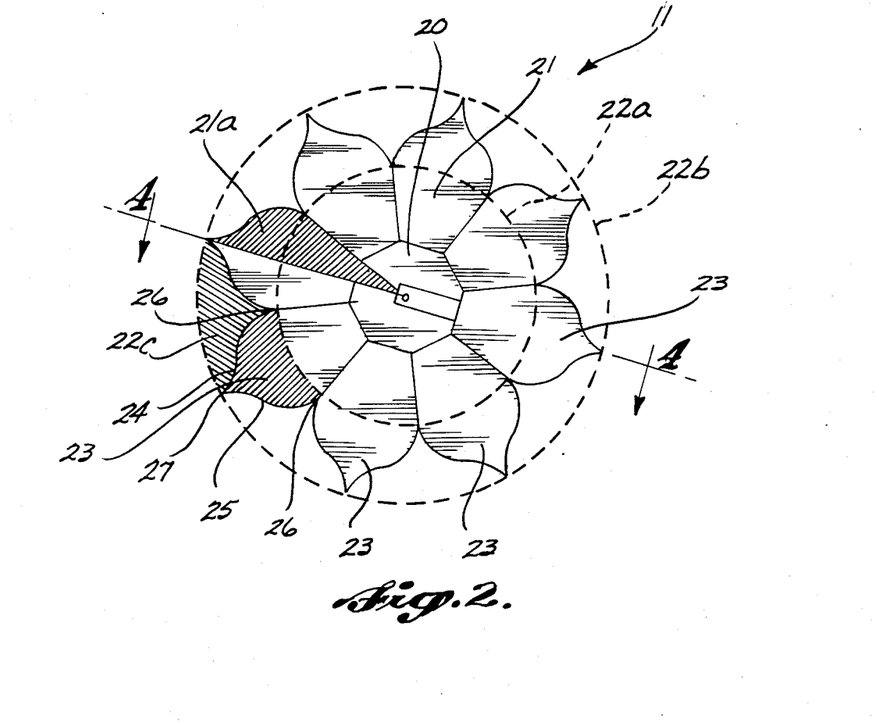
FIG. 2 is a top plan view of one embodiment of the present invention.

An acoustically hard base 11 according to one aspect of the present invention is shown in FIG. 2. The base 11 includes a central member 20 having an octagonal edge geometry. A petal-like member 21 is attached to each of the octal peripheral edges of the central member 20 and extends generally radially outward therefrom. The petal-like members 21 are attached along corresponding abutting edges to each other out to the point at which the attached edges intersect an inner circle represented by a dashed line 22a. With further radial extension beyond the line 22a, the adjoining edges of adjacent petal-like members 21 separate and cause the petal-like members 21 to describe what is hereinafter referred to as a plurality of tapered members 23. One such of the tapered members 23 is shaded in FIG. 2 to provide a clearer illustration thereof. Each of the tapered members 23 includes a pair of converging edges 24 and 25 emanating outwardly from a root 26 at the inner circle line 22a and extending along a curved path to converge and form a tip 27. The tips 27 describe an outer circle represented by a dashed line 22b.

It will be noted from the figure that the area of the base 11 encompassed within the inner circle line 22a is solid. Between the inner and outer circle lines 22a and 22b, the incremental area of the base 11 gradually decreases with outward radial progression. It necessarily follows that the incremental area between the inner and outer circle lines of the terrain upon which the base 11 is situated gradually increases. This change in the terrain is illustrated in FIG. 2 by the shaded portion 22c.

Figure 3:
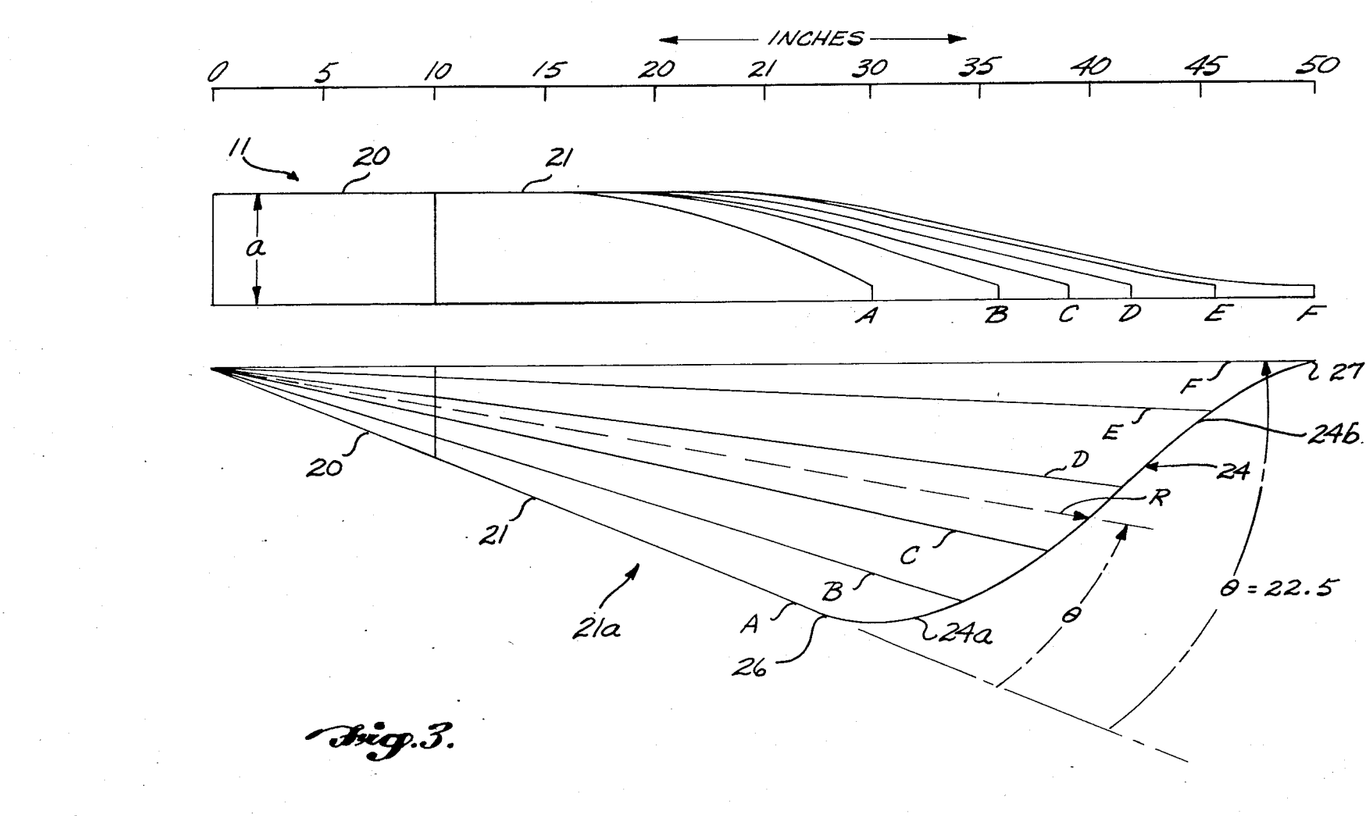

FIG. 3 illustrates in greater detail the shaded wedge-shaped segment in FIG. 2 identified by the reference numeral 21a. A horizontal scale located at the top of the figure is in inches and defines the radius of a base 11 formed in accordance with the invention that has been constructed and tested. The vertical dimension, identified as "a", has been greatly exaggerated in the figure so that the surface contours of the base 11 are more clearly shown. In actual practice, the dimension "a" is approximately one inch.

The lowermost portion of FIG. 3 is a top plan view of the aforementioned wedge-shaped segment 21a. Superimposed on the segment are a plurality of radial lines A through F that all emanate from an origin corresponding to the microphone location. The radial lines terminate at various positions along the edge 24 of the petal-like member 21. The upper portion of the figure illustrates a plurality of sectional views of the base 11 as taken along each of the radial lines A through F. As previously noted, it should be borne in mind that the vertical dimension "a" is exaggerated to illustrate surface contours more clearly.

It will be noted from FIGS. 2 and 3 that each of the edges 24 and 25 of the tapered members 23 include a pair of curves of opposite hand between their respective roots and tips. As shown in FIG. 3, a first curve 24a emanates from the root 26. This curve describes an arc having an edge slope wherein the incremental change in radial line length ($\Delta r$) continuously diminishes with incremental counterclockwise angular rotation ($\Delta \theta$) from the radial line A. The edge slope of a second curve 24b is similarly characterized, except that it is of opposite hand. That is, the edge slope $\Delta r/\Delta \theta$ of the curve 24b increases with counterclockwise angular rotation towards the radial line F. The curves 24a and 24b substantially tangentially intersect the radial lines A and F, respectively. Thus, their respective edge slopes each approach an infinite limit at their respective positions of intersection.

The edge 24 of the embodiment shown in FIGS. 2 and 3 is described for various angles $\theta$ by the equation:

$$\theta = \frac{\pi}{8}\left[1 - \cos^2 \frac{\pi}{2}\left(\frac{R - R_A}{R_F - R_A}\right)\right]$$

wherein:
(1) $R_A$ = length of radial line A;
(2) $R_F$ = length of radial line F;
(3) R = length of a radial line at an assumed value for $\theta$; and
(4) $0° \leq \theta \leq 22.5°$ In the tested and constructed embodiment of the invention, $R_F$ is 50.0 inches and $R_A$ is 30.0 inches.

For reasons that are not altogether fully understood, the inventors herein have discovered that a flush-dish microphone having tapered members as above-described realizes a substantial decrease in edge diffraction effects over a flush-dish microphone without such tapered members whenever an aircraft is substantially directly overhead. It is believed that the reduction in edge diffraction effects results from imparting a curvature to the edge of each tapered member. The curvature appears to produce a gradual and favorable impedance match at the terrain/tapered member boundary.

Figure 4:
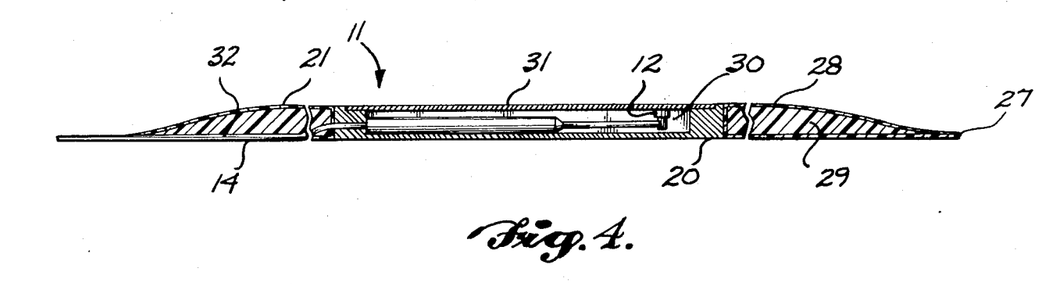
FIG. 4 is a partial cross-sectional side view of the embodiment shown in FIG. 2 along line 4—4.
Figure 5:
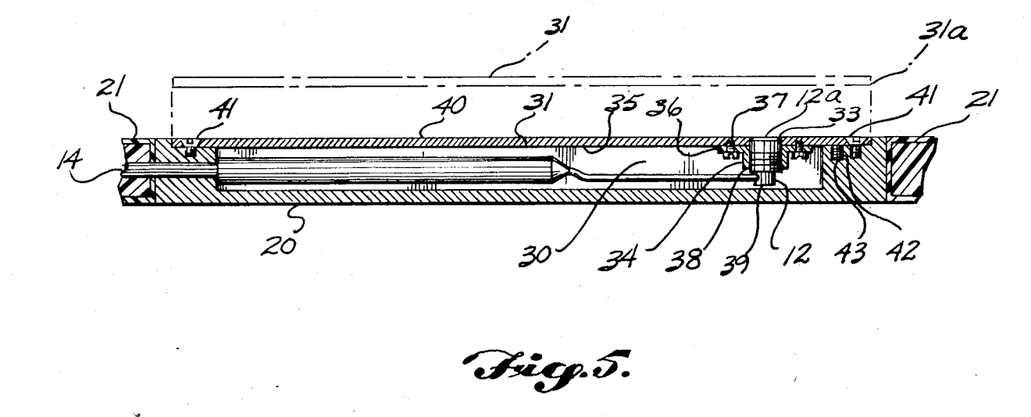
FIG. 5 is an enlarged view of a portion of the cross-sectional view shown in FIG. 4.

Details concerning the preferred way of constructing the above-described embodiment are shown in FIGS. 4 and 5. The petal-like members 21 are each formed from a hollow fiberglass shell 28 having the interior thereof filled with a relatively lightweight and rigid foam layer 29. Preferably, the walls of the shell 28 are approximately 0.125 inches thick, and are formed in a conventional manner using overlapping layers of fiberglass cloth. A suitable foam for the layer 29 is commercially available from the Fluorocarbon Company of Seattle, Wash. under the brand name Hetrafoam.

The central member 20 is formed from a solid block of fiberglass having a recess 30 in which the microphone 12 is mounted. A protective cover plate 31 encloses the microphone 12 in the recess 30. The underside of one petal-like member 21 includes a radial groove 32 that receives the electrical lead 14.

Referring particularly to FIG. 5, the cover plate 31 includes an aperture 33 for receiving the diaphragm 12a of the microphone 12. A tubular boss 34 is coaxially aligned with the aperture 33 and extends downwardly from the lower surface 35 of the cover plate 31 into the recess 30. A flange 36 extends transversely outward from one end of the boss 34, the flange 36 being secured to the surface 36 by any suitable means such as the illustrated screws 37. The boss 34 is internally threaded, as at 38, and threadably receives an externally threaded male coupler 39 surmounted upon the microphone 12. The coupler 39 is axially received within the boss 34 a distance sufficient to align the diaphragm 12a flush with the upper surface 40 of the cover plate 31. The cover plate 31 is secured to the central member 20 by any suitable means such as the illustrated screws 41. Removal of the cover plate 31 to gain access to the microphone 12 is facilitated by means of a bias spring 42 received in a cavity 43. The spring 42 bears against the cover plate 31 and lifts the edge 31a thereof a distance sufficient to permit the edge to be easily manually grasped.

Figure 6:
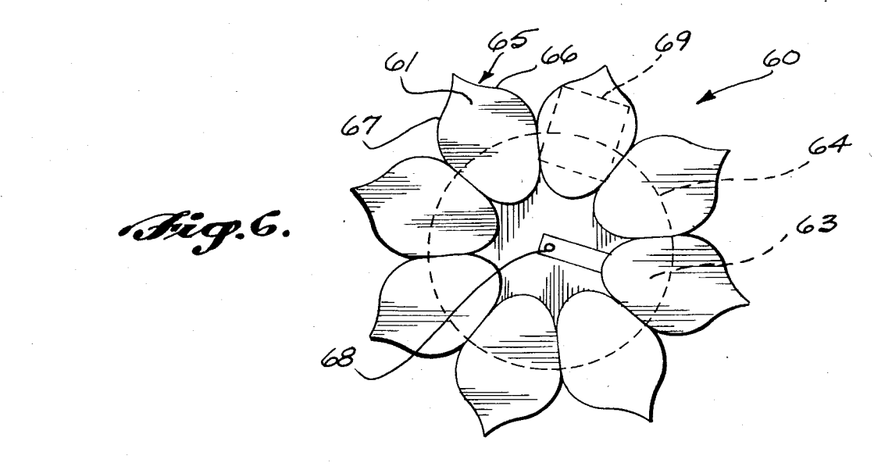
FIG. 6 is a top plan view of a second embodiment of the present invention.
Figure 7:
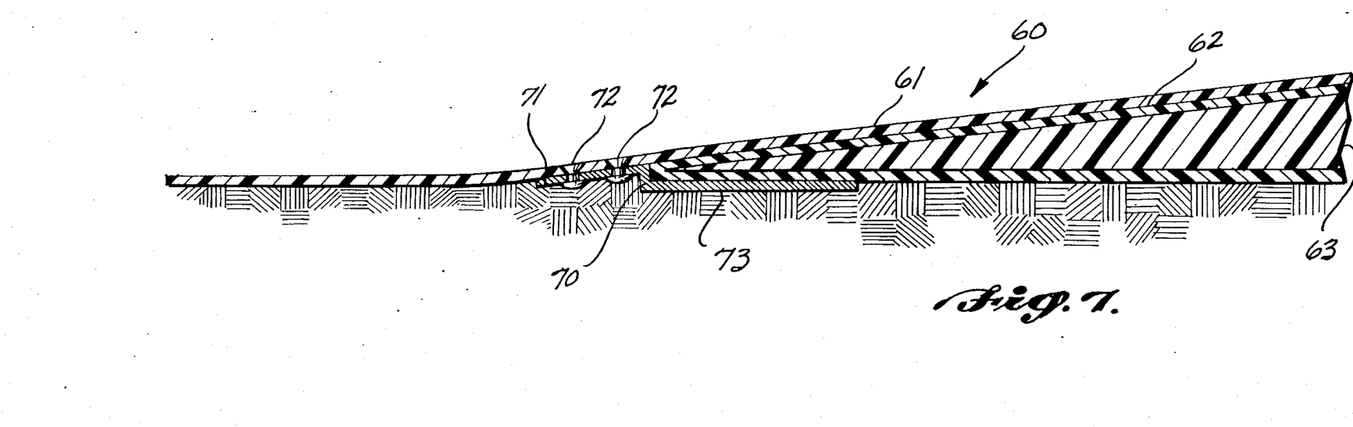
FIG. 7 is a partial cross-sectional side view of the embodiment shown in FIG. 6.

A second form of the invention is illustrated in FIGS. 6 and 7. This form comprises a flush-dish microphone system 60 having a plurality of plates 61 mounted on the upper surface of a circular base 63. The plates 61 extend radially outward from the periphery 64 of the base 63 and define, in plan form, a plurality of tapered members 65. The tapered members 65 include converging edges 66 and 67 that are in all respects geometrically identical to the edges 24 and 25 of the tapered members 23 earlier described. A microphone 68 is flush-mounted in the center of the base 63.

The plates 61 are preferably formed from relatively stiff material that is sufficiently flexible to accommodate some unevenness in the surrounding terrain. Sheets of aluminum approximately 0.05 inches thick have proven to be entirely satisfactory. Preferably, a layer of conventional visco-elastic damping tape 69 is attached to the underside of each of the plates 61 to reduce plate vibration.

The plates 61 are each removably attached to the base 63 by a clip 70. The clips 70 include a flange 71 secured against the underside of the plate 61 by any suitable means such as the rivets 72. The clips 70 further include a flange 73 that is received between ground and the outer edge of the base 63. Preferably, each of the plates 61 is provided with two of the clips 70 positioned just slightly inboard the roots of converging edges 66 and 67.

In this second form of the invention it is desirable that the plates 61 engage both the ground and the base 63 as closely as possible to avoid resonance of either the plates or any air volume trapped beneath the plates. Furthermore, through-holes (not shown) may be provided and spaced slightly inboard along the converging edges 66 and 67 to permit the use of ground stakes (not shown).

Figures 8, 9:
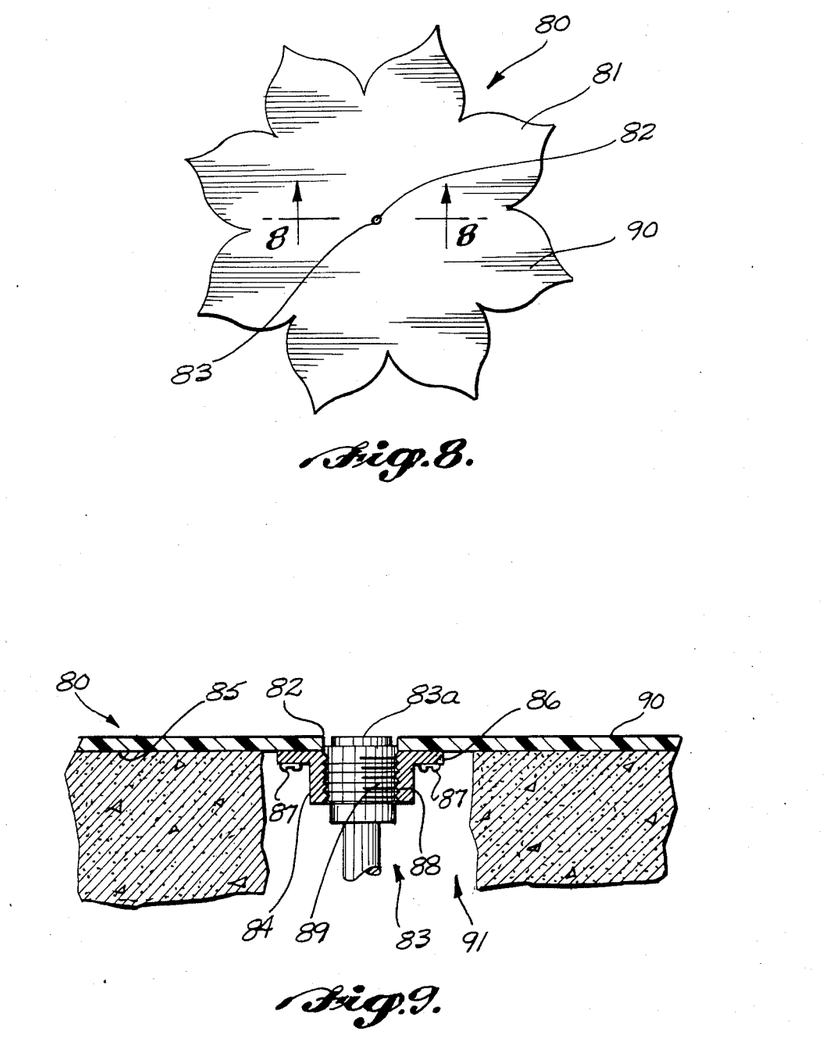
FIG. 8 is a top plan view of a third embodiment of the present invention.
FIG. 9 is a partial cross-sectional side view of the embodiment shown in FIG. 8 along line 8—8.

A third and simplified form of the invention is illustrated in FIGS. 8 and 9. This form comprises an acoustic reflector or base 80 that is formed from a flat sheet of acoustically hard material. The sheet is cut to provide the base 80 with a peripheral edge 81 geometrically identical to those of the other forms of the invention previously discussed.

Referring particularly to FIG. 9, the base 80 is provided with a central aperture 82 that receives the diaphragm 83a of a microphone 83. A tubular boss 84 is coaxially aligned with the aperture 82 and extends downwardly from the lower surface 85 of the base 80. A flange 86 extends transversely outwardly from one end of the boss 84, the flange 86 being secured to the surface 85 by any suitable means such as the illustrated screws 87. The boss 84 is internally threaded, as at 88, and threadably receives an externally threaded male coupler 89 that is surmounted upon the microphone 83. The coupler 89 is axially received within the boss 84 a distance sufficient to align the diaphragm 83a flush with the upper surface 90 of the base 80. In use, the base 80 is situated directly upon natural terrain wherein a relatively small hole 91 has been provided to accommodate the microphone 83. If desired, the external surfaces of the microphone 83 situated in the hole 91 can be provided with a protective coating (not shown) to protect against dirt, moisture, and other like contaminants.

In view of the foregoing it will be appreciated that disclosed herein is a flush-dish microphone system that to a substantial degree overcomes the edge diffraction effects associated with such systems of the prior art whenever an aircraft is positioned substantially directly overhead. The flush-dish microphone system of this invention employs a uniquely contoured peripheral geometry that is believed to result in a gradual matching of acoustic impedance between the system itself and the terrain upon which it is deployed. The system is relatively compact, lightweight, easily deployed, and particularly useful in the measurement of aircraft flyover noise.

While alternate, particular embodiments of the present invention have been disclosed herein, it will be understood that various changes, rearrangements and modifications can be made thereto without departing from the essence and scope of the invention as defined in the appended claims. Accordingly, it is intended that the present disclosure not be interpreted in a limiting sense and that obvious variations of the invention are comprehended to be within its essence and scope.

The embodiments of the invention in which an exclusive property or privilege is claimed are defined as follows:

1. An acoustic reflector for a ground plane microphone useful for measuring the flyover noise produced by an aircraft, said acoustic reflector comprising an acoustically hard base member including a central portion having a cavity extending inwardly from a surface thereof suitable for receiving a microphone, and a plurality of tapered projections spaced along and extending outwardly from the periphery of said central portion, each of said tapered projections having curved peripheral edges for progressively matching the acoustic impedance at the boundary between said base member and the surface upon which said base member is deployed to effectively reduce edge diffraction contamination of the flyover noise signal sensed by a microphone mounted in said cavity.

2. An acoustic reflector as set forth in claim 1, wherein each of said curved peripheral edges define a pair of curves of opposite hand.

3. An acoustic reflector as set forth in claim 2, wherein:

(a) the periphery of said central portion describes a circle; and (b) said pair of curves are described by the equation:

$$\theta = \frac{\pi}{8}\left[1 - \cos^2\frac{\pi}{2}\left(\frac{R - R_1}{R_2 - R_1}\right)\right]$$

wherein:
(1) $R_1$ = the circle radius
(2) $R_2$ = the maximum radial extension of the tapered projections beyond the circle
(3) R = the length of a radial line to a curved peripheral edge of a tapered projection for an assumed value of $\theta$
(4) $0° \leq \theta \leq 22.5°$.

4. An acoustic reflector as set forth in claim 1, wherein said acoustically hard base member comprises a unitary piece.

5. An acoustic reflector as set forth in claim 1, wherein at least one of said tapered projections comprises a plate abuttingly engaging said central portion.

6. An acoustic reflector as set forth in claim 5, wherein said plate at least in part overlies said central portion.

7. An acoustic reflector as set forth in claim 5, further comprising fastening means for removably attaching said plate to said central portion.

8. An acoustic reflector as set forth in claim 6, further comprising fastening means for removably attaching said plate to said central portion.

9. An acoustic reflector as set forth in claim 5, further comprising damping means on said plate for reducing the vibration thereof.

10. An acoustic reflector as set forth in claim 9, wherein said damping means comprises damping tape mounted on the side of said plate facing the surface upon which said base member is deployed.

11. An acoustic reflector as set forth in claim 1, further comprising mounting means for mounting a microphone in said cavity such that the diaphragm of said microphone is supported in substantially coplanar alignment with the surface of said central portion from which said cavity extends inwardly.

12. An acoustic reflector as set forth in claim 1, wherein said acoustically hard base member is formed in part between said cavity and said curved peripheral edges from a spaced pair of relatively thin walls, and a layer of material in the space between said walls sufficiently rigid to impart acoustical hardness to said walls.

13. An acoustic reflector as set forth in claim 12, wherein said material comprises a rigid foam.

14. An acoustic reflector for a ground plane microphone useful for measuring the flyover noise produced by an aircraft, said acoustic reflector comprising an acoustically hard base member including a central portion and a plurality of tapered projections spaced along and extending outwardly from the periphery of said central portion, each of said tapered projections having curved peripheral edges for progressively matching the acoustic impedance at the boundary between said base member and the surface upon which said base member is deployed to effectively reduce edge diffraction contamination of the flyover noise signal sensed by a microphone mounted in said central portion of said base member.

15. An acoustic reflector as set forth in claim 14, wherein each of said curved peripheral edges defines a pair of curves of opposite hand.

16. An acoustic reflector as set forth in claim 15, wherein:
   (a) the periphery of said central portion describes a circle; and
   (b) said pair of curves are described by the equation:

$$\theta = \frac{\pi}{8}\left[1 - \cos^2\frac{\pi}{2}\left(\frac{R - R_1}{R_2 - R_1}\right)\right]$$

wherein:
(1) $R_1$ = the circle radius
(2) $R_2$ = the maximum radial extension of the tapered projections beyond the circle
(3) $R$ = the length of a radial line to a curved peripheral edge of a tapered projection or an assumed value of $\theta$
(4) $0° \leq \theta \leq 22.5°$.

17. An acoustic reflector as set forth in claim 14, wherein said acoustically hard base member comprises a substantially planar unitary piece.

18. An acoustic reflector as set forth in claim 17, further including an aperture extending through said central portion, and receiving means for receiving a microphone in said aperture such that the diaphragm of said microphone is supported in substantially coplanar alignment with the upwardly facing surface of said central portion.

19. An acoustic reflector as set forth in claim 14, further including an aperture extending through said central portion, and receiving means for receiving a microphone in said aperture such that the diaphragm of said microphone is supported in substantially coplanar alignment with the upwardly facing surface of said central portion.

* * * * *